United States Patent
Zhu et al.

(10) Patent No.: US 10,531,438 B2
(45) Date of Patent: Jan. 7, 2020

(54) CONTROL INFORMATION SENDING METHOD, USER EQUIPMENT, AND NETWORK SIDE DEVICE

(71) Applicant: HUAWEI TECHNOLOGIES CO., LTD., Shenzhen (CN)

(72) Inventors: Song Zhu, Beijing (CN); Xiaolong Guo, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 130 days.

(21) Appl. No.: 15/245,372

(22) Filed: Aug. 24, 2016

(65) Prior Publication Data

US 2016/0366679 A1    Dec. 15, 2016

Related U.S. Application Data

(63) Continuation of application No. PCT/CN2014/072564, filed on Feb. 26, 2014.

(51) Int. Cl.
*H04W 72/04* (2009.01)
*H04L 1/22* (2006.01)
(Continued)

(52) U.S. Cl.
CPC .......... *H04W 72/0406* (2013.01); *H04L 1/22* (2013.01); *H04W 36/00* (2013.01); *H04W 48/12* (2013.01);
(Continued)

(58) Field of Classification Search
CPC ........ H04B 17/318; H04L 1/22; H04W 36/00; H04W 48/12; H04W 72/0406; H04W 74/004; H04W 84/042
(Continued)

(56) References Cited

U.S. PATENT DOCUMENTS 5,845,209 A * 12/1998 Iwata .................. H04W 24/00
455/423
6,320,843 B1    11/2001 Rydbeck et al.
(Continued)

FOREIGN PATENT DOCUMENTS

CN    1284252 A    2/2001
CN    1326626 A    12/2001
(Continued)

OTHER PUBLICATIONS

International Search Report and Written Opinion dated Dec. 4, 2014 in corresponding International Patent Application No. PCT/CN2014/072564.
(Continued)

*Primary Examiner* — Stephen J Clawson
(74) *Attorney, Agent, or Firm* — Leydig, Voit & Mayer, Ltd.

(57) ABSTRACT

The present invention provides a control information sending method, user equipment, and a network side device, where the control information sending method includes: determining, by the user equipment, to change an accessed control channel from a first control channel to a second control channel; sending, by the user equipment, indication information of the second control channel to a network side device, so that the network side device sends control information to the user equipment over the second control channel according to the indication information of the second control channel. By using the technical solutions provided in embodiments of the present invention, control information sending efficiency can be improved.

11 Claims, 8 Drawing Sheets

User equipment determines to change an accessed control channel from a first control channel to a second control channel — S100

The user equipment sends indication information of the second control channel to a network side device, so that the network side device sends control information to the user equipment over the second control channel according to the indication information of the second control channel — S101

(51) Int. Cl.
*H04W 36/00* (2009.01)
*H04W 48/12* (2009.01)
*H04W 74/00* (2009.01)
H04W 84/04 (2009.01)
H04B 17/318 (2015.01)

(52) U.S. Cl.
CPC ......... *H04W 74/004* (2013.01); *H04B 17/318* (2015.01); *H04W 84/042* (2013.01)

(58) Field of Classification Search
USPC .......................................................... 370/252
See application file for complete search history.

(56) References Cited

U.S. PATENT DOCUMENTS

| | | | |
|---|---|---|---|
| 6,493,552 B1 | 12/2002 | Hicks | |
| 2001/0031631 A1* | 10/2001 | Pitts | H04M 3/38 455/411 |
| 2008/0025266 A1* | 1/2008 | Tynderfeldt | H04B 7/2653 370/337 |
| 2011/0319080 A1 | 12/2011 | Bienas et al. | |
| 2012/0190378 A1* | 7/2012 | Han | H04B 7/0639 455/452.2 |
| 2012/0327894 A1 | 12/2012 | Axmon et al. | |
| 2013/0122921 A1* | 5/2013 | Juppi | H04W 72/048 455/450 |
| 2013/0155990 A1 | 6/2013 | Nishio et al. | |

FOREIGN PATENT DOCUMENTS

| | | |
|---|---|---|
| CN | 102300243 A | 12/2011 |
| EP | 0 260 763 A2 | 3/1988 |
| WO | WO 99/29134 | 6/1999 |
| WO | WO 2012/029245 A1 | 3/2012 |
| WO | WO 2014/087145 A1 | 6/2014 |

OTHER PUBLICATIONS

Extended European Search Report dated Nov. 30, 2016 in corresponding European Patent Application No. 14883791.7.
"On common control channels for enhanced coverage MTC UE", 3GPP TSG RAN WG1 Meeting #76, R1-140746, 3rd Generation Partnership Project, Feb. 10-14, 2014, Prague, Czech Republic, pp. 1-2.
International Search Report dated Dec. 4, 2014 in corresponding International Application No. PCT/CN2014/072564.

* cited by examiner

CONTROL INFORMATION SENDING METHOD, USER EQUIPMENT, AND NETWORK SIDE DEVICE

CROSS-REFERENCE TO RELATED APPLICATIONS

This application is a continuation of International Application No. PCT/CN2014/072564, filed on Feb. 26, 2014, which is hereby incorporated by reference in its entirety.

TECHNICAL FIELD

Embodiments of the present invention relate to communications technologies, and in particular, to a control information sending method, user equipment, and a network side device.

BACKGROUND

With rapid expansion of Machine to Machine (M2M for short) communications applications, market demands and scales of the M2M communications applications have met explosive growth in recent years.

In a conventional M2M system, when multiple control channels exist, a network side device determines in advance a control channel on which user equipment (UE for short) is located, and sends control information to the UE over the control channel on which the UE is located. When a total quantity of UEs on the control channel on which the UE is located reaches a preset upper limit, the network side device may send, to the UE, a notification message for changing the control channel, so as to instruct the UE to switch from the control channel on which the UE is currently located to another control channel, and then send control information to the UE over the control channel to which the UE changes.

However, for the UE, a channel condition of a control channel on which the UE is actually located is not considered during a manner in which the network side device sends, to the UE by determining the total quantity of UEs on the control channel on which the UE is located, the notification message for changing the control channel. Therefore, such a control information sending manner is inefficient.

SUMMARY

The present invention provides a control information sending method, user equipment, and a network side device, so as to resolve a prior-art problem of low control information sending efficiency.

According to a first aspect of the present invention, a control information sending method is provided, where in a scenario in which at least two control channels exist, the method includes:
  determining, by the user equipment, to change an accessed control channel from a first control channel to a second control channel; and
  sending, by the user equipment, indication information of the second control channel to a network side device, so that the network side device sends control information to the user equipment over the second control channel according to the indication information of the second control channel.

According to the first aspect, in a first possible implementation manner, the determining, by the user equipment, to change an accessed control channel from a first control channel to a second control channel specifically includes:
  measuring, by the user equipment, signal strength, where the signal strength is reference signal strength of a cell in which the user equipment is currently located, or signal strength of the first control channel; and
  determining, by the user equipment, to change the accessed control channel from the first control channel to the second control channel, if the signal strength is lower than a preset first threshold of the first control channel and higher than a preset second threshold of the second control channel.

With reference to the first aspect and the first possible implementation manner, in a second possible implementation manner, the sending, by the user equipment, indication information of the second control channel to a network side device specifically includes:
  sending, by the user equipment, the indication information to the network side device if a current moment is within a preset report timeslot; or skipping sending the indication information to the network side device until a report timeslot arrives, if a current moment is not within the report timeslot.

According to a second aspect of the present invention, a control information sending method is provided, where in a scenario in which at least two control channels exist, the method includes:
  receiving, by a network side device, indication information that is sent by user equipment and is of a second control channel, where the second control channel is an accessed control channel changed from a first control channel accessed by the user equipment; and
  sending, by the network side device, control information to the user equipment over the second control channel according to the indication information of the second control channel.

According to the second aspect, in a first possible implementation manner, the receiving, by a network side device, indication information that is sent by user equipment and is of a second control channel specifically includes:
  receiving, by the network side device within a preset report timeslot, the indication information that is sent by the user equipment and is of the second control channel.

According to a third aspect of the present invention, a control information sending method is provided, where in a scenario in which at least two control channels exist, the method includes:
  sending, by a network side device, a first access message to user equipment over a first control channel accessed by the user equipment;
  if feedback information sent by the user equipment is not received, repeatedly sending, by the network side device, a second access message to the user equipment over a second control channel until a preset sending stop condition is met or a first feedback message sent by the user equipment is received, where the second control channel includes at least one channel except the first control channel; and
  sending, by the network side device, control information to the user equipment over a second control channel on which the first feedback message sent by the user equipment is received.

According to the third aspect, in a first possible implementation manner, the sending, by the network side device, a second access message to the user equipment over a second control channel includes:

sending, by the network side device, the second access message to the user equipment according to a level of the second control channel.

According to the first possible implementation manner, in a second possible implementation manner, the sending, by the network side device, the second access message to the user equipment according to a level of the second control channel specifically includes:

sequentially sending, by the network side device starting from a second control channel of a lowest coverage level, the second access message to the user equipment over all second control channels in ascending order of coverage levels, until the preset sending stop condition is met or the first feedback message sent by the user equipment is received.

According to a fourth aspect of the present invention, user equipment is provided, where the user equipment is applied to a scenario in which at least two control channels exist, and includes:

a determining module, configured to determine to change an accessed control channel from a first control channel to a second control channel; and a sending module, configured to send indication information of the second control channel determined by the determining module to a network side device, so that the network side device sends control information to the user equipment over the second control channel according to the indication information of the second control channel.

According to the fourth aspect, in a first possible implementation manner, the determining module is specifically configured to:

measure signal strength, where the signal strength is reference signal strength of a cell in which the user equipment is currently located, or signal strength of the first control channel; and determine to change the accessed control channel from the first control channel to the second control channel, if the signal strength is lower than a preset first threshold of the first control channel and higher than a preset second threshold of the second control channel.

With reference to the fourth aspect and the first possible implementation manner, in a second possible implementation manner, the sending module is specifically configured to:

send, by the user equipment, the indication information to the network side device if a current moment is within a preset report timeslot; or skip sending the indication information to the network side device until a report timeslot arrives, if a current moment is not within the report timeslot.

According to a fifth aspect of the present invention, a network side device is provided, where the network side device is applied to a scenario in which at least two control channels exist, and includes:

a receiving module, configured to receive indication information that is sent by user equipment and is of a second control channel, where the second control channel is an accessed control channel changed from a first control channel accessed by the user equipment; and a sending module, configured to send control information to the user equipment over the second control channel according to the indication information that is received by the receiving module and is of the second control channel.

According to the fifth aspect, in a first possible implementation manner, the receiving module is specifically configured to:

receive, within a preset report timeslot, the indication information that is sent by the user equipment and is of the second control channel.

According to a sixth aspect of the present invention, a network side device is provided, where the network side device is applied to a scenario in which at least two control channels exist, and includes:

a sending module, configured to send a first access message to user equipment over a first control channel accessed by the user equipment; where the sending module is further configured to repeatedly send a second access message to the user equipment over a second control channel after the sending module sends the first access message and before feedback information sent by the user equipment is received, where the second control channel includes at least one control channel except the first control channel; and a determining module, configured to determine that the sending module repeatedly sends the second access message until a preset sending stop condition is met; or a receiving module, configured to receive, after the sending module sends the second access message, a first feedback message sent by the user equipment; where the sending module is configured to send control information to the user equipment over the second control channel after the determining module determines that the preset sending stop condition is met or the receiving module receives the first feedback message.

According to the sixth aspect, in a first possible implementation manner, the sending module is specifically configured to:

send the second access message to the user equipment according to a level of the second control channel.

According to the first possible implementation manner, in a second possible implementation manner, the sending module is specifically configured to:

sequentially send, starting from a second control channel of a lowest coverage level, the second access message to the user equipment over all second control channels in ascending order of coverage levels, until the preset sending stop condition is met or the first feedback message sent by the user equipment is received.

According to a seventh aspect of the present invention, user equipment is provided, where the user equipment is applied to a scenario in which at least two control channels exist, and includes:

a processor, configured to determine to change an accessed control channel from a first control channel to a second control channel; and a transmitter, configured to send indication information of the second control channel determined by the processor to a network side device, so that the network side device sends control information to the user equipment over the second control channel according to the indication information of the second control channel.

According to the seventh aspect, in a first possible implementation manner, the processor is specifically configured to:

measure signal strength, where the signal strength is reference signal strength of a cell in which the user equipment is currently located, or signal strength of the first control channel; and determine to change the accessed control channel from the first control channel to the second control channel, if the signal strength is lower than a preset first threshold of the first control channel and higher than a preset second threshold of the second control channel.

With reference to the seventh aspect and the first possible implementation manner, in a second possible implementation manner, the transmitter is specifically configured to:

send, by the user equipment, the indication information to the network side device if a current moment is within a preset report timeslot; or skip sending the indication information to the network side device until a report timeslot arrives, if a current moment is not within the report timeslot.

According to an eighth aspect of the present invention, a network side device is provided, where the network side device is applied to a scenario in which at least two control channels exist, and includes:

a receiver, configured to receive indication information that is sent by user equipment and is of a second control channel, where the second control channel is an accessed control channel changed from a first control channel accessed by the user equipment; and a transmitter, configured to send control information to the user equipment over the second control channel according to the indication information that is received by the receiver and is of the second control channel.

According to the eighth aspect, in a first possible implementation manner, the receiver is specifically configured to:

receive, within a preset report timeslot, the indication information that is sent by the user equipment and is of the second control channel.

According to a ninth aspect of the present invention, a network side device is provided, where the network side device is applied to a scenario in which at least two control channels exist, and includes:

a transmitter, configured to send a first access message to user equipment over a first control channel accessed by the user equipment; where the transmitter is further configured to repeatedly send a second access message to the user equipment over a second control channel after the first access message is sent and before feedback information sent by the user equipment is received, where the second control channel includes at least one control channel except the first control channel; and a processor, configured to determine that the transmitter repeatedly sends the second access message until a preset sending stop condition is met; or the processor, configured to receive, after the transmitter sends the second access message, a first feedback message sent by the user equipment; where the transmitter is configured to send control information to the user equipment over the second control channel after the processor determines that the preset sending stop condition is met or the processor receives the first feedback message.

According to the ninth aspect, in a first possible implementation manner, the transmitter is specifically configured to:

send the second access message to the user equipment according to a level of the second control channel.

According to the first possible implementation manner, in a second possible implementation manner, the transmitter is specifically configured to:

sequentially send, starting from a second control channel of a lowest coverage level, the second access message to the user equipment over all second control channels in ascending order of coverage levels, until the preset sending stop condition is met or the first feedback message sent by the user equipment is received.

According to the control information sending method, the user equipment, and the network side device in the embodiments of the present invention, the user equipment determines to change an accessed control channel from a first control channel to a second control channel, and sends indication information of the second control channel to the network side device, so that the network side device sends control information to the user equipment over the second control channel according to the indication information of the second control channel. By using the technical solutions provided in the embodiments of the present invention, control information sending efficiency can be improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
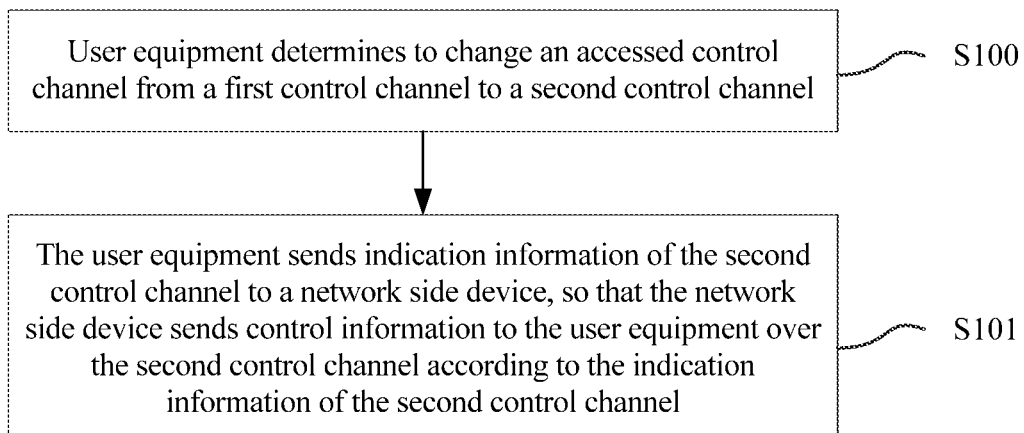
FIG. 1 is a flowchart of a control information sending method according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

User equipment in this application may be a wireless terminal or may be a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a remote station, an access point, a remote terminal, an access terminal, a user terminal, a user agent, a user device, or user equipment.

A network side device in this application may be a base station, a radio network controller (RNC), or the like; or may be a function module of each of the foregoing devices on a radio access network side.

The base station (for example, an access point) may refer to a device that is in an access network and communicates with a wireless terminal over an air interface via one or more sectors. The base station may be configured to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS) in GSM or CDMA, or may be a base station (NodeB) in WCDMA, or may be an evolved NodeB (eNB, or e-NodeB) in LTE, which is not limited in this application.

The base station controller may be a base station controller (BSC) in GSM or CDMA, or may be a radio network controller (RNC) in WCDMA, which is not limited in this application.

FIG. 1 is a flowchart of a control information sending method according to an embodiment of the present invention. In this embodiment, in a scenario in which at least two control channels exist, after determining to change an accessed control channel from a first control channel to a second control channel, user equipment sends, to a network side device, indication information of the second control channel to which the user equipment changes, so that the network side device can determine, according to the foregoing indication information, a control channel that the user equipment camps on, so as to send control information to the user equipment over the second control channel. As shown in FIG. 1, the method includes the following steps:

Step S100: The user equipment determines to change the accessed control channel from the first control channel to the second control channel.

Step S101: The user equipment sends the indication information of the second control channel to the network side device, so that the network side device sends the control information to the user equipment over the second control channel according to the indication information of the second control channel.

When multiple control channels exist in a system and each control channel is corresponding to a different coverage level, a control channel that the user equipment camps on may change. If the control channel that the user equipment camps on changes, because indication information stored by the network side device is indication information of a control channel that the user equipment camps on before the change, the user equipment can send, to the network side device, indication information of a control channel to which the user equipment changes, so that the network side device can learn the control channel on which the user equipment is located, and send control information to the user equipment according to the foregoing indication information. The coverage level herein is used to indicate a transmission rate that is of user equipment and that can be supported by the control channel. A higher coverage level indicates that more user equipments can be covered by the control channel. To consider multiple user equipments, the transmission rate that can be supported by the control channel is lower. A lower coverage level indicates that less user equipments can be covered by the control channel. In this case, less user equipments need to be considered, and therefore the transmission rate that can be supported by the control channel is higher.

Specifically, the user equipment may first determine to change the control channel accessed by the user equipment from the first control channel to the second control channel. Optionally, the user equipment may measure signal strength, where the signal strength may be reference signal strength of a cell in which the user equipment is currently located, or signal strength of the first control channel. If the signal strength measured by the user equipment is lower than a first threshold preset by the system for the first control channel and higher than a second threshold preset by the system for the second control channel, the user equipment may determine to change the control channel that the user equipment camps on, that is, change the control channel accessed by the user equipment from the first control channel to the second control channel. Both the first control channel and the second control channel in this application broadly refer to a control channel that user equipment can camp on in a network, but not particularly refer to a specified control channel. In addition, practically, the foregoing first threshold and second threshold may be obtained according to simulation experience.

Further, after determining to change the first control channel to the second control channel, the user equipment may send the indication information of the second control channel to the network side device, so that the network side device determines, according to the indication information of the second control channel, a control channel that the user equipment camps on, so as to send the control information to the user equipment over the second control channel.

In a feasible implementation manner, the user equipment may pre-agree with the network side device on a report timeslot, and send the indication information of the second control channel to the network side device within the agreed report timeslot; in another feasible implementation manner, the user equipment may send the indication information within a conventional uplink timeslot. The network side device may obtain the foregoing indication information by detecting information sent by the user equipment within the foregoing report timeslot or uplink timeslot.

Optionally, as information that indicates the control channel that the user equipment camps on, the foregoing indication information may be information that directly indicates a resource occupied by the second control channel, for example, time domain information, frequency domain information, or scrambling code information of the second control channel; or may be an identifier that is of a control channel and pre-agreed on by the network side device and the user equipment, for example, a change identifier that is pre-agreed on by the network side device and the user equipment and is used to indicate a resource occupied by the control channel. After receiving the change identifier, the network side device may determine the indication information of the second control channel by searching a preset mapping table between a change identifier and indication information of a control channel.

In this embodiment, multiple control channels exist in a system, and each control channel may have a different channel state. Some control channels may support a high transmission rate and some control channels support a low transmission rate. Therefore, user equipment may determine whether to change a first control channel according to a channel state of the first control channel on which the user equipment is actually located. For example, if the first control channel on which the user equipment itself is located has a relatively poor channel state and can support only a low transmission rate, but the user equipment itself requires a higher-rate data service, in this case, the user equipment may change the first control channel on which the user equipment is located to a second control channel that has a better channel state and that can support a higher transmission rate, and send indication information of the second control channel to a network side device, so as to ensure that the network side device can send control information to the user equipment according to the indication information. By comparison, in the prior art, the system includes only one control channel on which the control information is sent to all user equipments. If a channel on which some user equipments are located has a relatively poor state, to consider all user equipments, the network side device can send the control information only at a low transmission rate to ensure that all user equipments can receive the control information. However, by using a technical solution provided in this embodiment, because multiple control channels that can support different transmission rates exist in the system, the user equipment can change a control channel according to an actual situation, and send, to the network side device, indication information of a control channel to which the user equipment changes, so that the network side device can send the control information to the user equipment according to the foregoing indication information, thereby improving control information sending efficiency.

Figure 2:
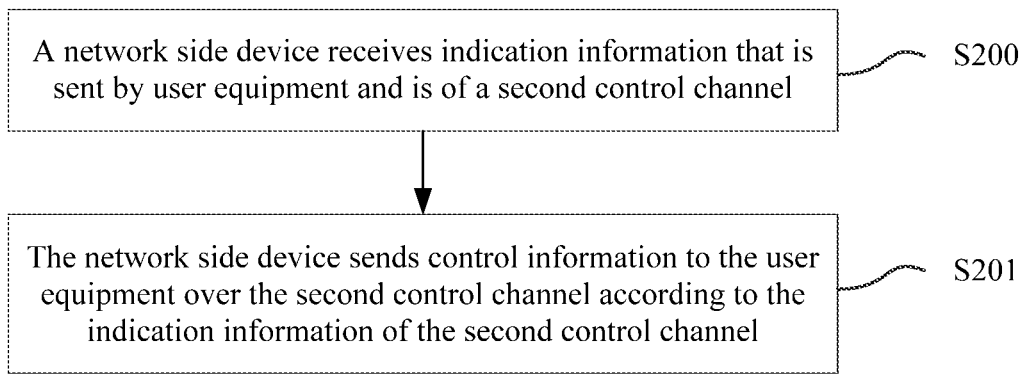
FIG. 2 is a flowchart of another control information sending method according to an embodiment of the present invention.

FIG. 2 is a flowchart of another control information sending method according to an embodiment of the present invention. In this embodiment, in a scenario in which at least two control channels exist, after receiving indication information that is sent by user equipment and is of a second control channel, a network side device determines, according to the foregoing indication information, a control channel that the user equipment camps on, and sends control information to the user equipment over the second control channel that the user equipment camps on. As shown in FIG. 2, the method includes the following steps:

Step S200: A network side device receives indication information that is sent by user equipment and is of a second control channel.

Step S201: The network side device sends control information to the user equipment over the second control channel according to the indication information of the second control channel.

The foregoing steps are performed by the network side device. Practically, the network side device may be a device that can communicate with the user equipment, such as a base station or a relay.

Specifically, the network side device needs to receive the indication information that is sent by the user equipment and is of the second control channel, where the second control channel is an accessed control channel changed from a first control channel accessed by the user equipment. In a feasible implementation manner, the network side device may receive, within a report timeslot pre-agreed on with the user equipment, the indication information sent by the user equipment; in another feasible implementation manner, the network side device may receive, within a conventional uplink timeslot, information sent by the user equipment, and then detect the indication information from the foregoing information.

After receiving the indication information that is sent by the user equipment and is of the second control channel, the network side device may send the control information to the user equipment over the second control channel according to the indication information of the second control channel.

As information that indicates the control channel that the user equipment camps on, the foregoing indication information may be information that directly indicates a resource occupied by the second control channel, for example, time domain information, frequency domain information, or scrambling code information of the second control channel; or may be an identifier that is of a control channel and pre-agreed on by the network side device and the user equipment, for example, a change identifier that is pre-agreed on by the network side device and the user equipment and is used to indicate a resource occupied by the control channel. After receiving the change identifier, the network side device may determine the indication information of the second control channel by searching a preset mapping table between a change identifier and indication information of a control channel.

In this embodiment, a network side device receives indication information that is sent by user equipment and is of a second control channel to which the user equipment changes, and sends control information to the user equipment over this control channel, thereby improving control information sending efficiency.

Figure 3:
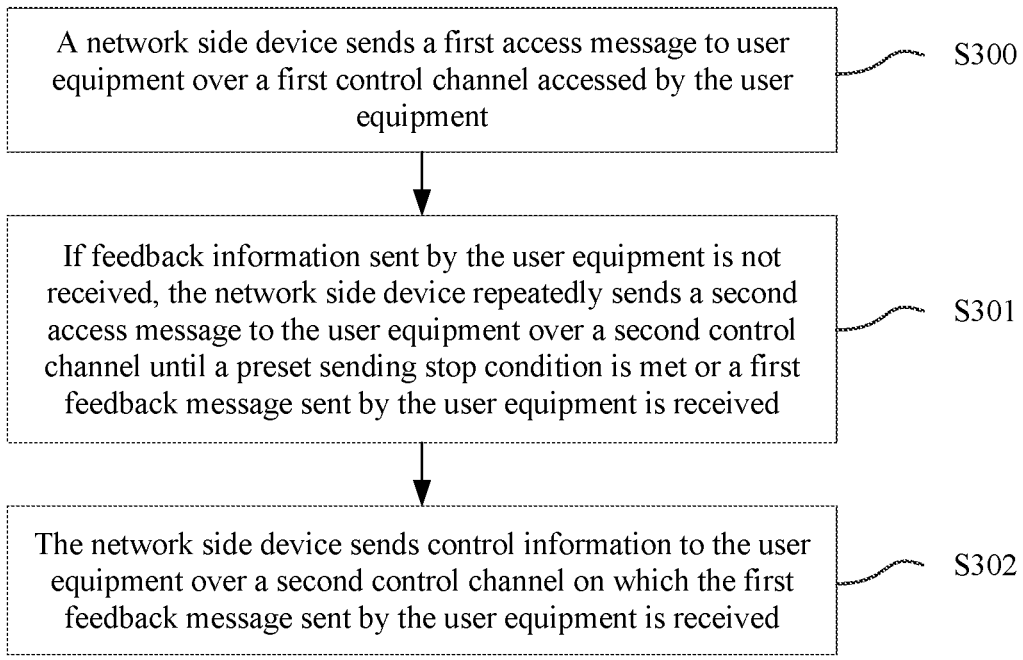
FIG. 3 is a flowchart of still another control information sending method according to an embodiment of the present invention.

FIG. 3 is a flowchart of another control information sending method according to an embodiment of the present invention. In this embodiment, in a scenario in which at least two control channels exist, after a network side device sends a first access message to user equipment over a first control channel accessed by the user equipment, if feedback information sent by the user equipment is not received, the network side device may repeatedly send a second access message to the user equipment over another second control channel until a preset sending stop condition is met or a first feedback message sent by the user equipment is received, and further send control information to the user equipment over a second control channel on which the first feedback message sent by the user equipment is received. As shown in FIG. 3, the method includes the following steps:

Step S300: A network side device sends a first access message to user equipment over a first control channel accessed by the user equipment.

Step S301: If feedback information sent by the user equipment is not received, the network side device repeatedly sends a second access message to the user equipment over a second control channel until a preset sending stop condition is met or a first feedback message sent by the user equipment is received.

Step S302: The network side device sends control information to the user equipment over a second control channel on which the first feedback message sent by the user equipment is received.

When the user equipment camps on the first control channel, the user equipment notifies the network side device of indication information of the control channel that the user equipment currently camps on. After receiving the indication information, the network side device stores the indication information, so as to send control information to the user equipment according to the indication information.

Specifically, before sending the control information to the user equipment, the network side device may first send the first access message to the user equipment over the first control channel accessed by the user equipment. Practically, because the first control channel may have a relatively poor channel state, the network side device may repeatedly send for multiple times the foregoing first access message to the user equipment over the first control channel until the feedback information of the user equipment is received.

Further, because multiple control channels exist in a system, if the user equipment does not feed back information, the user equipment may not camp on the first control channel any more. Therefore, the network side device may repeatedly send the second access message to the user equipment over the second control channel until the preset sending stop condition is met or the first feedback message sent by the user equipment is received, where the foregoing second control channel includes at least one control channel except the first control channel.

Optionally, the network side device may traverse all control channels in the system according to a specific rule. For example, the network side device may send, starting from a control channel of a lowest coverage level, the control information to the user equipment over all second control channels according to a coverage level of each control channel, until a quantity of times of sending the control information by the network side device reaches the preset sending stop condition, that is, a preset maximum quantity of sending times, or the first feedback message sent by the user equipment is received.

After receiving the first feedback message sent by the user equipment, the network side device may determine that a second control channel on which the first feedback message is received is a control channel on which the user equipment is currently located. Therefore, the network side device may send the control information to the user equipment over the second control channel.

In this embodiment, a network side device first sends a first access message to user equipment over a first control channel accessed by the user equipment. If feedback information sent by the user equipment is not received, the network side device repeatedly sends a second access message to the user equipment over a second control channel until a preset sending stop condition is met or a first feedback message sent by the user equipment is received. Then, the network side device may send control information to the user equipment over a second control channel on which the first feedback message sent by the user equipment is received. Therefore, when a control channel on which the user equipment is located changes, the user equipment does not need to send information to the network side device; instead, the network side device actively traverses to the control channel on which the user equipment is located, thereby not only improving control information sending efficiency, but also reducing a battery loss of the user equipment.

Figure 4:
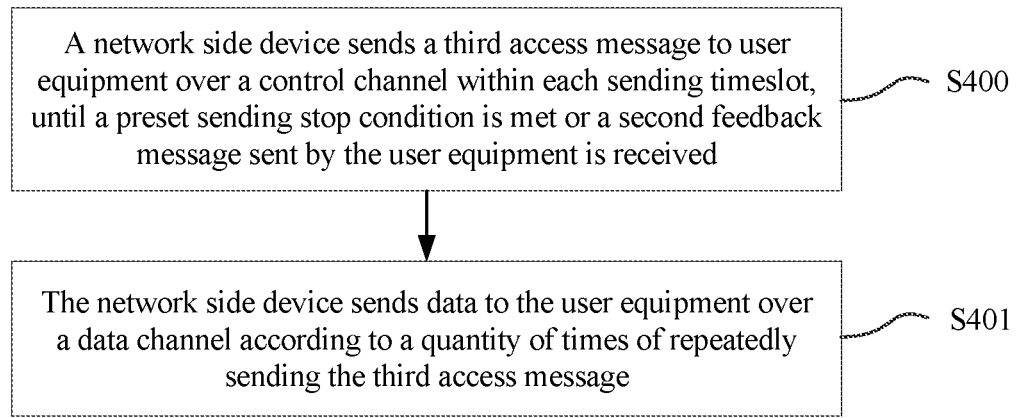
FIG. 4 is a flowchart of an access method of user equipment according to an embodiment of the present invention.

FIG. 4 is a flowchart of an access method of user equipment according to an embodiment of the present invention. In this embodiment, in a scenario in which one control channel exists, a network side device sends a third access message to user equipment over the control channel within each sending timeslot, until a preset sending stop condition is met or a second feedback message sent by the user equipment is received; and then sends data to the user equipment over a data channel according to a quantity of times of repeatedly sending the third access message. As shown in FIG. 4, the method includes the following steps:

Step S400: A network side device sends a third access message to user equipment over a control channel within each sending timeslot, until a preset sending stop condition is met or a second feedback message sent by the user equipment is received.

Step S401: The network side device sends data to the user equipment over a data channel according to a quantity of times of repeatedly sending the third access message.

The foregoing steps are performed by the network side device. Practically, the network side device may be a device that can communicate with the user equipment, such as a base station or a relay.

Specifically, the network side device may send the third access message to the user equipment over the control channel within a sending timeslot. Because a channel state of the foregoing control channel may not be ideal, the third access message sent once by the network side device may not be successfully received. Therefore, the network side device may continue to send the foregoing third access message to the user equipment within a next timeslot. If feedback information of the user equipment is still not received, the third access message is repeatedly sent until the preset sending stop condition is met or the second feedback message sent by the user equipment is received. The foregoing sending stop condition may be preset according to an actual channel state and is used to indicate a maximum quantity of times of sending the third access message to the user equipment by the network side device. If the channel state is poorer, the maximum quantity of times may be larger; if the channel state is better, the maximum quantity of times may be smaller.

When a quantity of times of sending the third access message to the user equipment by the network side device meets the preset sending stop condition or the second feedback message sent by the user equipment is received, the network side device may send data to the user equipment over the data channel according to the quantity of times of repeatedly sending the third access message.

For example, if the foregoing sending stop condition is 10 times, the network side device sends the third access message to the user equipment within the first sending timeslot and does not receive the second feedback message fed back by the user equipment, and the network side device sends again the third access message to the user equipment within the second sending timeslot and receives the second feedback message fed back by the user equipment, in this case, the network side device can consider that the network side device needs to send the third access message twice, that is, the user equipment can successfully receive the third access message and feed back the second feedback message only when control information within the foregoing two sending timeslots is packed and sent to the user equipment. Therefore, this process is equivalent to a process of measuring a channel of the control channel. Therefore, when sending data, the network side device may pack and send data within the two sending timeslots to the user equipment without needing to perform repeated sending for multiple times and await a feedback of the user equipment.

It should be noted that an interval between the foregoing two sending timeslots may be pre-agreed on by the user equipment and the network side device.

In this embodiment, a network side device sends a third access message to user equipment over a control channel within each sending timeslot, until a preset sending stop condition is met or a second feedback message sent by the user equipment is received; and then sends data to the user equipment over a data channel according to a quantity of times of repeatedly sending the third access message, thereby improving data channel sending efficiency.

Figure 5:
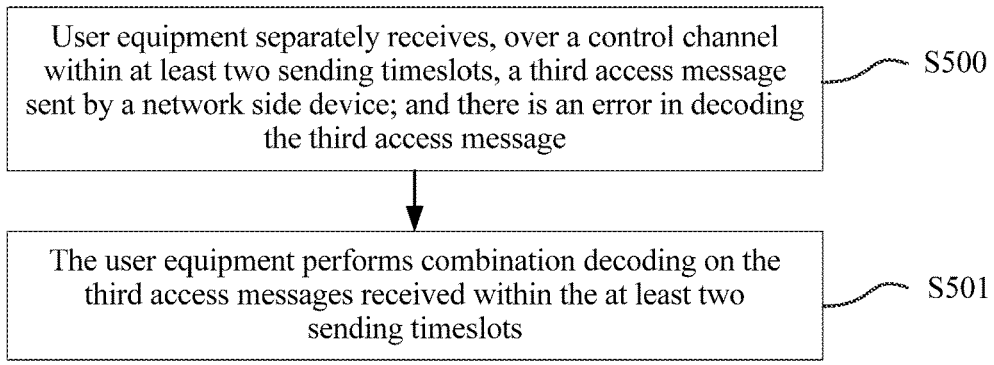
FIG. 5 is a flowchart of another access method of user equipment access method according to an embodiment of the present invention.

FIG. 5 is a flowchart of another access method of user equipment according to an embodiment of the present invention. In this embodiment, in a scenario in which one control channel exists, user equipment separately receives, over the control channel within at least two sending timeslots, a third access message sent by a network side device; and decodes the third access message. If there is a decoding error, the user equipment performs combination decoding on the third access messages received within the at least two sending timeslots. As shown in FIG. 5, the method includes the following steps:

Step S500: User equipment separately receives, over a control channel within at least two sending timeslots, a third access message sent by a network side device; and there is an error in decoding the third access message.

Step S501: The user equipment performs combination decoding on the third access messages received within the at least two sending timeslots.

The foregoing steps are performed by the user equipment. Practically, the user equipment may be a terminal device that can communicate with the network side device, such as a cell phone.

Specifically, the user equipment separately receives, over the control channel within the at least two sending timeslots, the third access message sent by the network side device; and decodes the third access message. If there is an error in decoding the third access message by the user equipment, the user equipment performs combination decoding on the third access messages received within the foregoing at least two sending timeslots.

Further, when the network side device sends the third access message to the user equipment within a sending timeslot, if decoding the third access message by the user equipment fails, the user equipment may continue to listen on the control channel within a next sending timeslot, that is, the user equipment receives the third access message over the control channel, and performs combination decoding on the third access messages. If the decoding still fails, the user equipment continues to listen on the control channel within a next-next timeslot. By analogy, the user equipment continues to listen on the control channel until the receiving succeeds. Practically, the user equipment may determine, according to a verification code carried in the third access message, whether the user equipment performs correct decoding.

Figure 6:
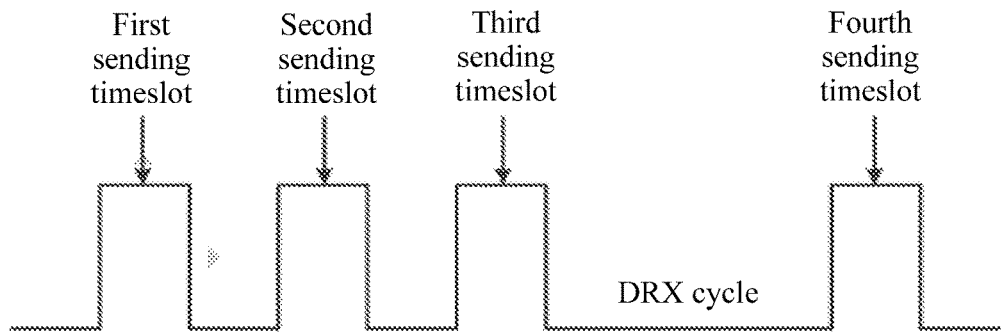
FIG. 6 is a schematic diagram of listening on a control channel by user equipment according to an embodiment.

FIG. 6 is a schematic diagram of listening on the control channel by the user equipment according to this embodiment. As shown in FIG. 6, the foregoing combination decoding process means that, if the user equipment receives a third access message within the first sending timeslot and there is a decoding error when the user equipment decodes the third access message; and there is a decoding error when the user equipment decodes a next third access message received within the second sending timeslot, the user equipment may perform combination decoding on the third access messages received within the previous sending timeslot and this sending timeslot, such as by using a soft-bit combination operation. If the decoding is still not correct, the user equipment continues to receive the third access message within the third sending timeslot. If there is still a decoding error when the third access message is decoded, the user equipment may perform combination decoding on the third access messages received within the foregoing three sending timeslots. If the combination decoding succeeds, optionally, the user equipment may determine whether the third access message is an access message for the user equipment. If the third access message is an access message for the user equipment, the user equipment may initiate an access process according to the third access message, so as to receive downlink data. If the third access message is not an access message for the user equipment, the user equipment enters a discontinuous reception (Discontinuous Reception, DRX for short) cycle, where the foregoing DRX cycle means that the user equipment listens on the control channel according to this cycle. Information can be received by the user equipment only when the information is sent to the user equipment at a location at which the user equipment wakes up from the DRX cycle of the user equipment. When the user equipment wakes up from the DRX cycle to start again to listen on a channel, that is, the user equipment receives another access message sent by the network side device, the foregoing combination decoding process is entered again in this case.

In this embodiment, user equipment performs combination decoding on third access messages received within at least two sending timeslots, which can improve third access message decoding efficiency, thereby improving efficiency of accessing a network side device by the user equipment.

Figure 7:
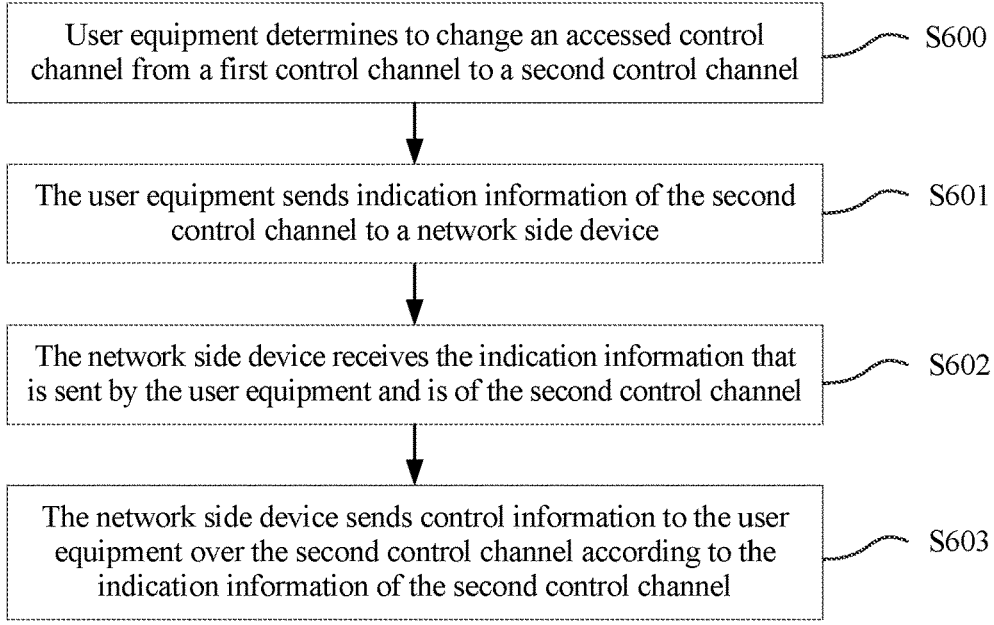
FIG. 7 is a flowchart of interaction between a network side device and user equipment according to an embodiment of the present invention.

FIG. 7 is a flowchart of interaction between a network side device and user equipment according to an embodiment of the present invention. In this embodiment, at least two control channels exist in a system. As shown in FIG. 7, the method includes the following steps:

Step S600: User equipment determines to change an accessed control channel from a first control channel to a second control channel.

The foregoing step is performed by the user equipment. Practically, the user equipment may be a terminal device that can communicate with a network side device, such as a cell phone.

A description in this step is the same as the description in step S100, and is not described herein again.

Step S601: The user equipment sends indication information of the second control channel to a network side device.

The foregoing step is performed by the user equipment. Practically, the user equipment may be a terminal device that can communicate with the network side device, such as a cell phone.

In a feasible implementation manner, the foregoing indication information may be at least one of time domain information, frequency domain information, or scrambling code information of the second control channel, and is used to indicate a time-frequency resource location occupied by the second control channel, or a scrambling code resource used by the second control channel. Specifically, the time domain information is a time domain resource location occupied by the second control channel; the frequency domain information is a frequency domain resource location occupied by the second control channel; and the scrambling code information is a scrambling code resource used when the network side device sends control information over the second control channel. It should be noted that, the foregoing time domain information, frequency domain information, or scrambling code information is pre-agreed on by the network side device and the user equipment. When the user equipment changes from the first control channel to the second control channel, one or more of the time domain information, the frequency domain information, or the scrambling code information change, and the user equipment may send, to the network side device, one or more of the foregoing changed time domain information, frequency domain information, or scrambling code information, which are used as the foregoing indication information.

In another feasible implementation manner, the foregoing indication information may be a preset change identifier, where the foregoing change identifier is pre-agreed on by the network side device and the user equipment, and is an identifier one-to-one corresponding to a parameter of a control channel. When receiving the change identifier, the network side device can uniquely determine a resource location occupied by the second control channel.

Specifically, when sending control information to the network side device, the user equipment may send the foregoing indication information to the network side device within a report timeslot pre-agreed on with the network side device, so that the network side device sends the control information to the user equipment over the second control channel according to the indication information of the second control channel.

Further, the user equipment sends the indication information to the network side device if a current moment is within the preset report timeslot; or, the user equipment does not send the indication information to the network side device until the report timeslot arrives, if a current moment is not within the report timeslot.

It should be noted that, practically, the foregoing report timeslot is within a listening timeslot pre-agreed on by the network side device and the user equipment, for example, within a period of time before a paging (paging) timeslot, a DRX cycle, or the like. In addition, if the user equipment determines that a control channel that the user equipment camps on needs to change, and a current moment is not within the report timeslot, the user equipment may automatically camp on the second control channel. Because the user equipment may change the control channel for multiple times before the report timeslot arrives, after the report timeslot arrives, the user equipment may report, to the network side device, indication information of a control channel to which the user equipment changes the last time.

In addition, multiple different control channels exist in the system, and each control channel has a different DRX cycle. When the user equipment changes from a control channel to another control channel, if the user equipment does not notify the network side device of a DRX cycle used by the user equipment, the network side device cannot learn when the user equipment wakes up, that is, when the user equipment listens on a channel. Therefore, the network side device cannot learn when to send the control information to the user equipment, so that the control information can be received by the user equipment.

In a feasible implementation manner, the network side device may notify in advance the user equipment of a DRX cycle configured for each control channel. Therefore, after the user equipment changes from the first control channel to the second control channel and sends the indication information of the second control channel to the network side device, both the network side device and the user equipment may directly use a preconfigured DRX cycle of the second control channel, so that it can be ensured that the network side device sends the control information to the user equipment when the user equipment wakes up.

In another feasible implementation manner, the user equipment may directly notify the network side device of a DRX cycle used by the user equipment after the user equipment changes to the second control channel, so that a network side device sends the control information to the user equipment according to the DRX cycle. Optionally, the user equipment may send the foregoing indication information of the second control channel together with the foregoing DRX cycle to the network side device within the foregoing preset report timeslot; or may send the foregoing DRX cycle to the network side device within another report timeslot that is preset with the network side device and is different from the foregoing report timeslot.

For example, two different control channels are used as an example. For example, if a unit frame length is fixed as 10 milliseconds, a 1× channel indicates a control channel whose frame length is 1 multiplied by the unit frame length, that is, 10 milliseconds, and an 8× channel indicates a control channel whose frame length is 8 multiplied by the unit frame length, that is, 80 milliseconds, a DRX cycle of user equipment of the 1× channel is in a unit of 1 multiplied by the unit frame length, such as 10 milliseconds or 20 milliseconds; and a frame length of the 8× channel is in a unit of 8 multiplied by the unit frame length, such as 80 milliseconds or 160 milliseconds.

In a feasible implementation manner, the user equipment may directly send a DRX cycle of the user equipment on the second control channel to the network side device.

In another feasible implementation manner, two DRX parameters may be configured for the user equipment. One is in a unit of 80 milliseconds and the other is in a unit of 10 milliseconds. If a control channel that the user equipment camps on changes, the user equipment may choose a corresponding DRX parameter according to a change condition of the control channel, and report the corresponding DRX parameter to the network side device within a report timeslot, so as to notify the network side device of a DRX cycle of a control channel on which the user equipment is located. Specifically, in the user equipment, one of the two DRX parameters may be set as a primary parameter, and the other as a secondary parameter. If the primary parameter does not change, the user equipment does not need to notify the network side device within the report timeslot; or, if the primary parameter changes, the user equipment reports a changed primary parameter to the network side device. For example, the foregoing two DRX parameters may be in a manner similar to a paging frame (Paging Frame, PF for short) and a paging occasion (Paging Occasion, PO for short) of a paging channel. Specifically, a frame number of a moment at which the user equipment wakes up to receive the control information is formed by the following two parts. Part 1 is a number of 80-millisecond duration that is of the 8× channel and within which 10-millisecond duration of the 1× channel falls. This parameter is similar to a system frame number (System Frame Number, SFN for short). For example, if timing starts at a same moment, the $10^{th}$ millisecond is within the first 80-millisecond duration, and the $100^{th}$ millisecond is within the second 80-millisecond duration. The parameter is in a unit of 80 milliseconds. Part 2 is a moment that is within 80-millisecond duration of the 8× channel and at which 10-millisecond duration of the 1× channel is located. This parameter is similar to a sub system frame number (Sub System Frame Number, SSFN for short). For example, if timing starts at a same moment and per subframe duration is 10 milliseconds, the $10^{th}$ millisecond is within the first subframe of the first 80-millisecond duration, and the $100^{th}$ millisecond is within the second subframe of the second 80-millisecond duration. The parameter is in a unit of 10 milliseconds. User equipment on the 1× channel needs to use both the SFN and the SSFN. However, user equipment on the 8× channel uses the SFN only. To reduce overheads, the SFN may be used as the primary parameter. That is, when the user equipment changes from the 8× channel to the 1× channel, where for example, a DRX cycle of the user equipment is 80 milliseconds, in this case, the user equipment still wakes up according to a cycle of 80 milliseconds. In this case, the SFN does not change, and therefore the DRX cycle does not need to be sent. When the user equipment changes from the 1× channel to the 8× channel, in this case, the user equipment notifies the network side device so that the network side device can determine a moment at which the user equipment wakes up on the 8× channel.

Step S602: The network side device receives the indication information that is sent by the user equipment and is of the second control channel.

The foregoing step is performed by the network side device. Practically, the network side device may be a device that can communicate with the user equipment, such as a base station or a relay.

Specifically, after the user equipment sends the indication information of the second control channel to the network side device, the network side device needs to receive the foregoing indication information, where the foregoing second control channel is an accessed control channel changed from the first control channel accessed by the user equipment.

Further, the network side device may receive, within the foregoing preset report timeslot, the indication information that is sent by the user equipment and is of the second control channel.

In addition, it may be learned according to the description in step S601 that, if the user equipment sends the DRX cycle of the second control channel to the network side device, the network side device needs to receive the DRX cycle that is sent by the user equipment and is of the user equipment on the second control channel.

Specifically, when the user equipment sends the DRX cycle of the user equipment on the control channel to the network side device, the network side device needs to receive the foregoing DRX cycle. Optionally, the network side device may receive the DRX cycle within the foregoing preset report timeslot, or may receive the DRX cycle within another report timeslot that is pre-agreed on with the user equipment and is different from the foregoing report timeslot.

Step S603: The network side device sends control information to the user equipment over the second control channel according to the indication information of the second control channel.

The foregoing step is performed by the network side device. Practically, the network side device may be a device that can communicate with the user equipment, such as a base station or a relay.

Optionally, the network side device may send the control information to the user equipment according to the DRX cycle of the user equipment when the user equipment wakes up.

A description in this step is the same as the description in step S201, and is not described herein again.

In this embodiment, because user equipment may change a control channel according to an actual situation and send, to a network side device, indication information of a control channel to which the user equipment changes, so that the network side device can send control information to the user equipment according to the foregoing indication information, thereby improving control information sending efficiency.

Figure 8:
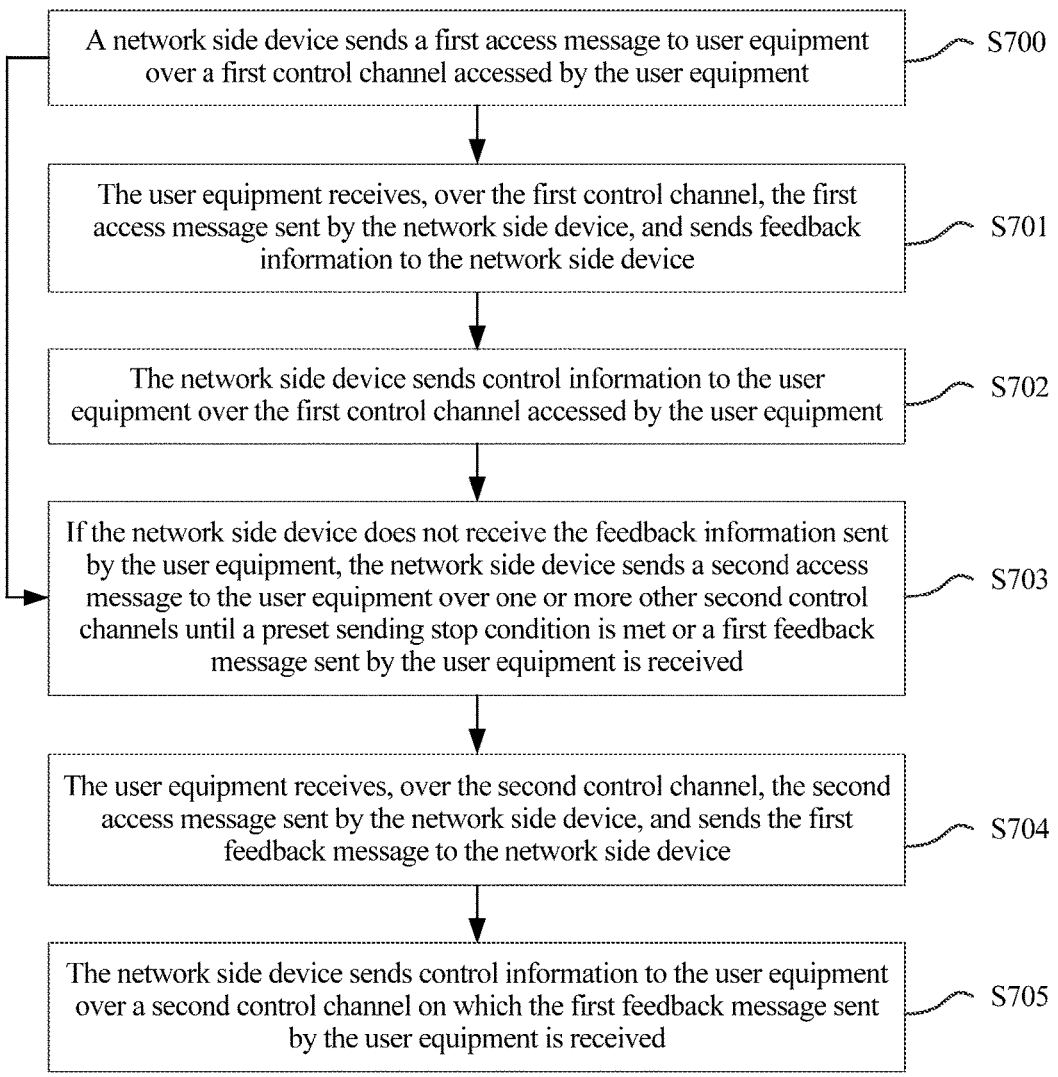
FIG. 8 is another flowchart of interaction between a network side device and user equipment according to an embodiment of the present invention.

FIG. 8 is another flowchart of interaction between a network side device and user equipment according to an embodiment of the present invention. In this embodiment, at least two control channels exist in a system. As shown in FIG. 8, the method includes the following steps:

Step S700: A network side device sends a first access message to user equipment over a first control channel accessed by the user equipment.

The foregoing step is performed by the network side device. Practically, the network side device may be a device that can communicate with the user equipment, such as a base station or a relay.

A description in this step is the same as the description in step S300, and is not described herein again.

Step S701: The user equipment receives, over the first control channel, the first access message sent by the network side device, and sends feedback information to the network side device.

The foregoing step is performed by the user equipment. Practically, the user equipment may be a terminal device that can communicate with the network side device, such as a cell phone.

Specifically, it may be learned from the description in step S300 that, when the user equipment still camps on the first control channel accessed by the user equipment, the network side device sends the first access message to the user equipment. After receiving the first access message, the user equipment needs to send the feedback information to the network side device, so as to notify the network side device that the user equipment receives the first access message.

It should be noted that, because the foregoing first control channel may be relatively poor, the network side device may repeatedly send the foregoing first access message for multiple times. The user equipment may perform combination decoding on the foregoing first access messages, that is, the user equipment performs soft-bit combination on the same information repeatedly received for multiple times; and send feedback information to the network side device after decoding succeeds. After receiving the feedback information, the network side device may perform step S702.

Step S702: The network side device sends control information to the user equipment over the first control channel accessed by the user equipment.

The foregoing step is performed by the network side device. Practically, the network side device may be a device that can communicate with the user equipment, such as a base station or a relay.

Specifically, because the network side device receives the feedback information of the user equipment, the network side device can send the control information to the user equipment over the first control channel.

It should be noted that step S701 and step S702 are optional. Because multiple control channels exist in the system, the user equipment may have changed from the first control channel previously accessed by the user equipment to another second control channel. Therefore, when the user equipment is no longer on the first control channel, step S701 and step S702 do not need to be performed.

Step S703: If the network side device does not receive the feedback information sent by the user equipment, the network side device repeatedly sends a second access message to the user equipment over a second control channel until a preset sending stop condition is met or a first feedback message sent by the user equipment is received.

The foregoing step is performed by the network side device. Practically, the network side device may be a device that can communicate with the user equipment, such as a base station or a relay.

Specifically, if the network side device does not receive the feedback information sent by the user equipment, the network side device may repeatedly send the second access message to the user equipment according to a level of the second control channel, where the second control channel includes at least one control channel except the first control channel.

Further, the network side device may sequentially send, starting from a second control channel of a lowest coverage level, the second access message to the user equipment over all second control channels in ascending order of coverage levels, until the preset sending stop condition is met or the first feedback message sent by the user equipment is received. It may be learned from the description in step S100 that a lower coverage level indicates that less user equipments can be covered by a second control channel. Therefore, the network side device may send, starting from the second control channel of the lowest coverage level, the second access message to the user equipment over all the second control channels, until the preset sending stop condition is met or the first feedback message sent by the user equipment is received, where the sending stop condition may be a preset maximum quantity of sending times obtained according to actual simulation experience. Certainly, the network side device may also repeatedly send the second access message over all the second control channels for multiple times until the preset maximum quantity of sending times is met, which is similar to sending of the first access message in step S700.

For example, it is assumed that there are three different control channels in the system, which are respectively a 1× channel, a 2× channel, and a 4× channel. It may be learned from the description in step S602 that, the 1× channel indicates a control channel whose frame length is 1 multiplied by a unit frame length. Similarly, the 2× channel indicates a control channel whose frame length is 2 multiplied by the unit frame length, and the 4× channel indicates a control channel whose frame length is 4 multiplied by the unit frame length. Because the foregoing three channels have different frame lengths, the foregoing three channels have different coverage levels. That is, when the network side device sends same information in one frame length of each of the foregoing three channels, because the 1× channel has the shortest frame length, the best channel quality, and the highest corresponding transmission rate, and only a small quantity of user equipments may have such good channel quality, user equipments that can be supported by the 1× channel are the least; because the 2× channel has a longer frame length, poorer channel quality, and a lower corresponding transmission rate, user equipments that can be supported by the 2× channel are more; because the 4× channel has the longest frame length, the poorest channel quality, and the lowest corresponding transmission rate, user equipments that can be supported by the 4× channel are the most. It is assumed that the first control channel accessed by the user equipment is the 2× channel. If the user equipment changes from the 2× channel to the 4× channel, that is, the second control channel on which the user equipment is currently located is the 4× channel, the network side device first sends the first access message over the 2× channel and receives no feedback information, and then sends the second access message over the 4× channel. Because the user equipment is on this channel, the user equipment can feed back information, and the network side device can stop sending the second access message. If the user equipment changes from the 2× channel to the 1× channel, the network side device still first sends the first access message over the 2× channel, then starts to send the second access message over the 4× channel, and continues to send the second access message over the 1× channel and then receives the feedback information of the user equipment. Then the network side device can stop sending the second access message.

Optionally, practically, when changing from a control channel of a higher coverage level to a control channel of a lower coverage level, the user equipment may continue to listen on the control channel that is of the higher coverage level and is previously accessed by the user equipment, which can improve efficiency of interaction with the network side device. The above example is used as an example. When the user equipment changes from the 2× channel to the 1× channel, the user equipment may continue to listen on the 2× channel, that is, the user equipment can still receive information sent by the network side device over the 2× channel. In this case, the network side device does not need to send the second access message again starting from the 4× channel; the user equipment can provide a feedback when the network side device sends the first access message over the 2× channel. However, if the user equipment changes from the 2× channel to the 4× channel, a coverage level changes in ascending order in this case. Therefore, when the user equipment is located on a control channel of a higher coverage level, a transmission rate supported by the user equipment becomes lower, and therefore, the user equipment cannot receive information on a control channel of a lower coverage level. Therefore, in this case, the network side device still needs to send the second access message according to the description in step S703.

Step S704: The user equipment receives, over the second control channel, the second access message sent by the network side device, and sends the first feedback message to the network side device.

The foregoing step is performed by the user equipment. Practically, the user equipment may be a terminal device that can communicate with the network side device, such as a cell phone.

Specifically, the second control channel herein is a control channel on which the user equipment is located after changing from the first control channel. When the network side device sends the second access message over the second control channel, the user equipment needs to receive the foregoing second access message and feed back the first feedback message to the network side device.

Optionally, when the network side device repeatedly sends the second access message for multiple times, the user equipment may perform combination decoding on information repeatedly sent for multiple times, and send the first feedback message to the network side device after decoding succeeds.

Step S705: The network side device sends control information to the user equipment over a second control channel on which the first feedback message sent by the user equipment is received.

The foregoing step is performed by the network side device. Practically, the network side device may be a device that can communicate with the user equipment, such as a base station or a relay.

A description in this step is the same as the description in step S302, and is not described herein again.

In this embodiment, a network side device first sends a first access message to user equipment over a first control channel accessed by the user equipment. If feedback information sent by the user equipment is not received, the network side device sends a second access message to the user equipment over a second control channel until a preset sending stop condition is met or a first feedback message sent by the user equipment is received. Then, the network side device may send control information to the user equipment over a second control channel on which the first feedback message sent by the user equipment is received. Therefore, when a control channel on which the user equipment is located changes, the user equipment does not need to send information to the network side device; instead, the network side device actively traverses to the control channel on which the user equipment is located, thereby not only improving control information sending efficiency, but also reducing a battery loss of the user equipment.

Figure 9:
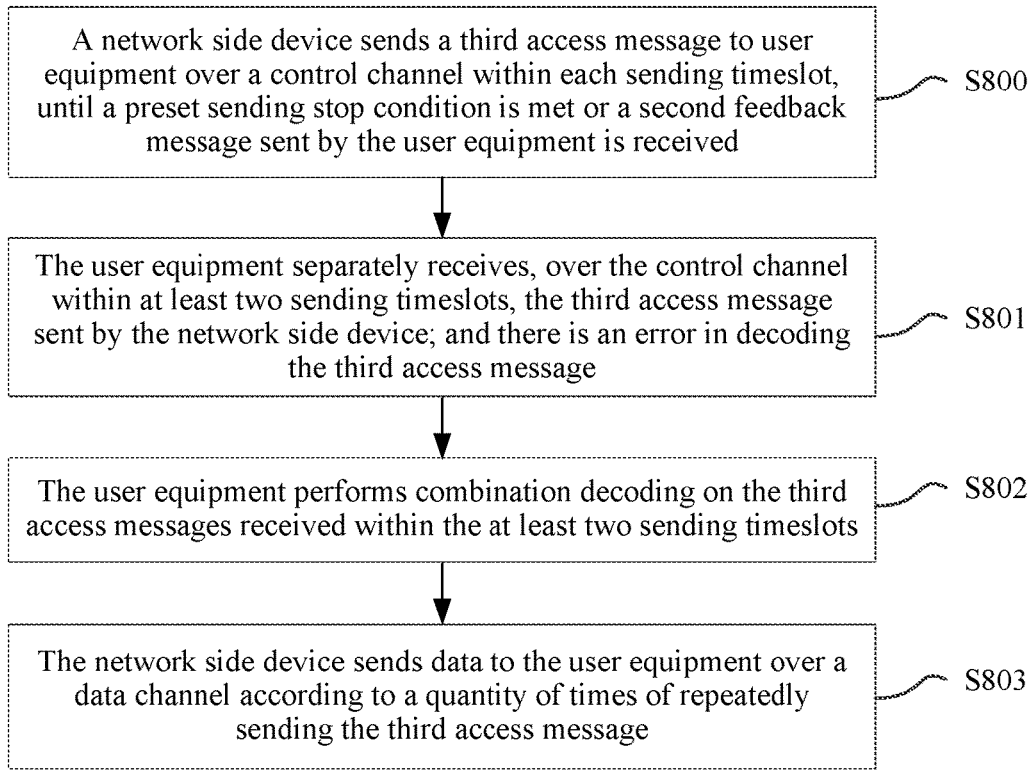
FIG. 9 is still another flowchart of interaction between a network side device and user equipment according to an embodiment of the present invention.

FIG. 9 is still another flowchart of interaction between a network side device and user equipment according to an embodiment of the present invention. In this embodiment, only one control channel exists in a system. As shown in FIG. 9, the method includes the following steps:

Step S800: A network side device sends a third access message to user equipment over a control channel within each sending timeslot, until a preset sending stop condition is met or a second feedback message sent by the user equipment is received.

Step S801: The user equipment separately receives, over the control channel within at least two sending timeslots, the third access message sent by the network side device; and there is an error in decoding the third access message.

Step S802: The user equipment performs combination decoding on the third access messages received within the at least two sending timeslots.

Step S803: The network side device sends data to the user equipment over a data channel according to a quantity of times of repeatedly sending the third access message.

The foregoing steps S800 and S803 are performed by the network side device. Practically, the network side device may be a device that can communicate with the user equipment, such as a base station or a relay. Specific descriptions in steps S800 and S803 are the same as the descriptions in steps S400 and S401, and are not described herein again.

The foregoing steps S801 and S802 are performed by the user equipment. Practically, the user equipment may be a terminal device that can communicate with the network side device, such as a cell phone. Specific descriptions in steps S801 and S802 are the same as the descriptions in steps S500 and S501, and are not described herein again.

In this embodiment, a network side device sends a third access message to user equipment over a control channel within each sending timeslot, until a preset sending stop condition is met or a second feedback message sent by the user equipment is received; and then sends data to the user equipment over a data channel according to a quantity of times of repeatedly sending the third access message, thereby improving data channel sending efficiency. The user equipment performs combination decoding on the third access messages, thereby improving efficiency of accessing the network side device by the user equipment.

Figure 10:
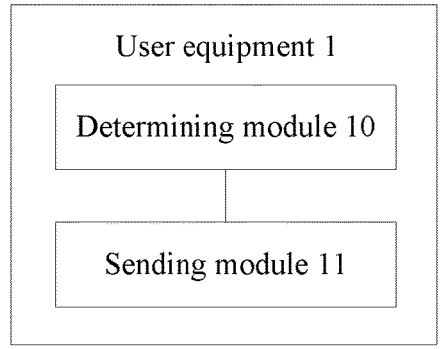
FIG. 10 is a schematic structural diagram of user equipment according to an embodiment of the present invention.

FIG. 10 is a schematic structural diagram of user equipment according to an embodiment of the present invention. As shown in FIG. 10, the user equipment 1 includes a determining module 10 and a sending module 11. The user equipment 1 is applied to a scenario in which at least two control channels exist.

Specifically, the determining module 10 is configured to determine to change an accessed control channel from a first control channel to a second control channel; the sending module 11 is configured to send indication information of the second control channel determined by the determining module 10 to a network side device, so that the network side device sends control information to the user equipment over the second control channel according to the indication information of the second control channel.

Further, the determining module 10 is specifically configured to: measure signal strength, where the signal strength is reference signal strength of a cell in which the user equipment is currently located, or signal strength of the first control channel; and determine to change the accessed control channel from the first control channel to the second control channel, if the signal strength is lower than a preset first threshold of the first control channel and higher than a preset second threshold of the second control channel. Still further, the sending module 11 is specifically configured to: send, by the user equipment, the indication information to the network side device if a current moment is within a preset report timeslot; or skip sending the indication information to the network side device until a report timeslot arrives, if a current moment is not within the report timeslot.

By using a technical solution provided in this embodiment, because user equipment 1 may change a control channel according to an actual situation and send, to a network side device, indication information of a control channel to which the user equipment changes, so that the network side device can send control information to the user equipment 1 according to the foregoing indication information, thereby improving control information sending efficiency.

Figure 11:
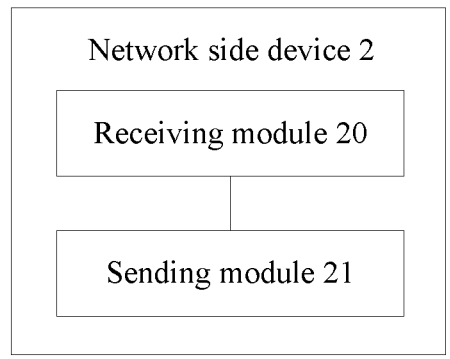
FIG. 11 is a schematic structural diagram of a network side device according to an embodiment of the present invention.

FIG. 11 is a schematic structural diagram of a network side device according to an embodiment of the present invention. As shown in FIG. 11, the network side device 2 includes a receiving module 20 and a sending module 21. The network side device 2 is applied to a scenario in which at least two control channels exist.

Specifically, the receiving module 20 is configured to receive indication information that is sent by user equipment and is of a second control channel, where the second control channel is an accessed control channel changed from a first control channel accessed by the user equipment; the sending module 21 is configured to send control information to the user equipment over the second control channel according to the indication information that is received by the receiving module 20 and is of the second control channel.

Further, the receiving module 20 is specifically configured to receive, within a preset report timeslot, the indication information that is sent by the user equipment and is of the second control channel.

In this embodiment, a network side device 2 receives indication information that is sent by user equipment and is of a second control channel to which the user equipment changes; and sends control information to the user equipment over this control channel, thereby improving control information sending efficiency.

Figure 12:
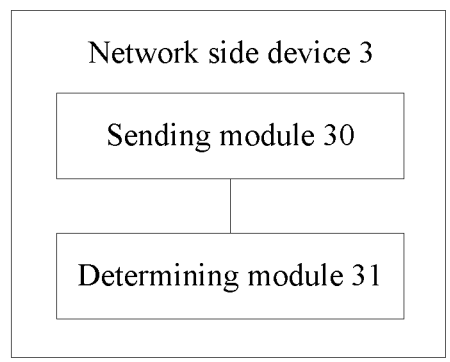
FIG. 12 is a schematic structural diagram of another network side device according to an embodiment of the present invention.

FIG. 12 is a schematic structural diagram of another network side device according to an embodiment of the present invention. As shown in FIG. 12, the network side device 3 includes a sending module 30 and a determining module 31. The network side device 3 is applied to a scenario in which at least two control channels exist.

Specifically, the sending module 30 is configured to send a first access message to user equipment over a first control channel accessed by the user equipment; the sending module 30 is further configured to repeatedly send a second access message to the user equipment over a second control channel after the sending module sends the first access message and before feedback information sent by the user equipment is received, where the second control channel includes at least one control channel except the first control channel; the determining module 31 is configured to determine that the sending module repeatedly sends the second access message until a preset sending stop condition is met; and the sending module 30 is configured to send control information to the user equipment over the second control channel after the determining module 31 determines that the preset sending stop condition is met or the receiving module receives a first feedback message.

Further, the sending module 30 is specifically configured to send the second access message to the user equipment according to a level of the second control channel.

Still further, the sending module 30 is specifically configured to sequentially send, starting from a second control channel of a lowest coverage level, the second access message to the user equipment over all second control channels in ascending order of coverage levels, until the preset sending stop condition is met or the first feedback message sent by the user equipment is received.

In this embodiment, a network side device 3 first sends a first access message to user equipment over a first control channel accessed by the user equipment. If feedback information sent by the user equipment is not received, the network side device 3 sends a second access message to the user equipment over a second control channel until a preset sending stop condition is met. Then, the network side device may send control information to the user equipment over a second control channel on which a first feedback message sent by the user equipment is received. Therefore, when a control channel on which the user equipment is located changes, the user equipment does not need to send information to the network side device 3; instead, the network side device 3 actively traverses to the control channel on which the user equipment is located, thereby not only improving control information sending efficiency, but also reducing a battery loss of the user equipment.

Figure 13:
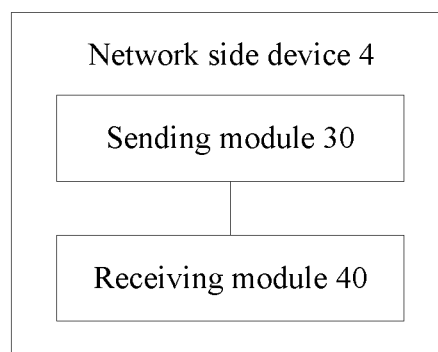
FIG. 13 is a schematic structural diagram of still another network side device according to an embodiment of the present invention.

FIG. 13 is a schematic structural diagram of still another network side device according to an embodiment of the present invention. As shown in FIG. 13, the network side device 4 includes a sending module 30 and a receiving module 40. The network side device 4 is applied to a scenario in which at least two control channels exist. The foregoing sending module 30 is the sending module 30 in the previous embodiment and is not described herein again.

Specifically, the receiving module 40 is configured to receive, after the sending module 30 sends a second access message, a first feedback message sent by user equipment.

In this embodiment, a network side device 4 first sends a first access message to user equipment over a first control channel accessed by the user equipment. If feedback information sent by the user equipment is not received, the network side device 4 sends a second access message to the user equipment over a second control channel until a first feedback message sent by the user equipment is received. Then, the network side device 4 may send control information to the user equipment over a second control channel on which the first feedback message sent by the user equipment is received. Therefore, when a control channel on which the user equipment is located changes, the user equipment does not need to send information to the network side device 4; instead, the network side device 4 actively traverses to the control channel on which the user equipment is located, thereby not only improving control information sending efficiency, but also reducing a battery loss of the user equipment.

Figure 14:
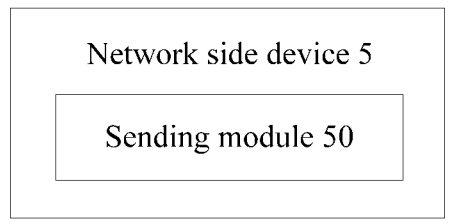
FIG. 14 is a schematic structural diagram of yet another network side device according to an embodiment of the present invention.

FIG. 14 is a schematic structural diagram of yet another network side device according to an embodiment of the present invention. As shown in FIG. 14, the network side device 5 includes a sending module 50. The network side device 5 is applied to a scenario in which one control channels exists.

Specifically, the sending module 50 is configured to send a third access message to user equipment over the control channel within each sending timeslot, until a preset sending stop condition is met or a second feedback message sent by the user equipment is received; the sending module 50 is further configured to send data to the user equipment over a data channel according to a quantity of times of repeatedly sending the third access message.

In this embodiment, a network side device 5 sends a third access message to user equipment over a control channel within each sending timeslot, until a preset sending stop condition is met or a second feedback message sent by the user equipment is received; and then sends data to the user equipment over a data channel according to a quantity of times of repeatedly sending the third access message, thereby improving data channel sending efficiency.

Figure 15:
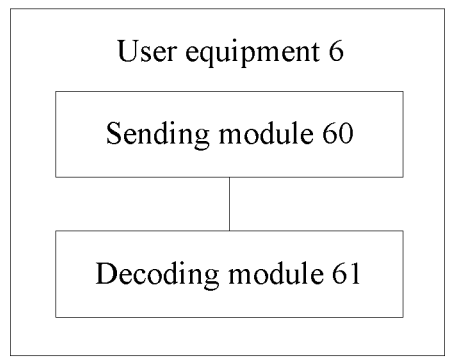
FIG. 15 is a schematic structural diagram of another user equipment according to an embodiment of the present invention.

FIG. 15 is a schematic structural diagram of another user equipment according to an embodiment of the present invention. As shown in FIG. 15, the user equipment 6 includes a sending module 60 and a decoding module 61. The user equipment 6 is applied to a scenario in which one control channel exists.

Specifically, the sending module 60 is configured to separately receive, over the control channel within at least two sending timeslots, a third access message sent by a network side device; and there is an error in decoding the third access message; the decoding module 61 is configured to perform combination decoding on the third access messages received within the at least two sending timeslots.

In this embodiment, user equipment 6 performs combination decoding on third access messages received within at least two sending timeslots, which can improve third access message decoding efficiency, thereby improving efficiency of accessing a network side device by the user equipment 6.

Figure 16:
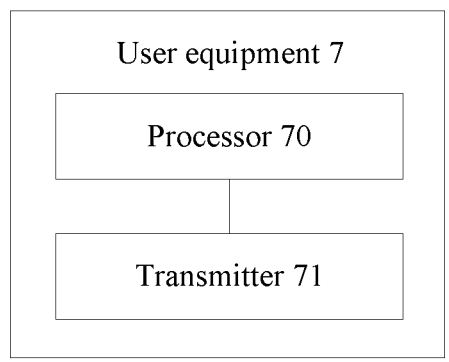
FIG. 16 is a schematic structural diagram of still another user equipment according to an embodiment of the present invention.

FIG. 16 is a schematic structural diagram of still another user equipment according to an embodiment of the present invention. As shown in FIG. 16, the user equipment 7 includes a processor 70 and a transmitter 71. The user equipment 7 is applied to a scenario in which at least two control channels exist.

Specifically, the processor 70 is configured to determine to change an accessed control channel from a first control channel to a second control channel; the transmitter 71 is configured to send indication information of the second control channel determined by the processor 70 to a network side device, so that the network side device sends control information to the user equipment over the second control channel according to the indication information of the second control channel.

Further, the processor 70 is specifically configured to: measure signal strength, where the signal strength is reference signal strength of a cell in which the user equipment is currently located, or signal strength of the first control channel; and determine to change the accessed control channel from the first control channel to the second control channel, if the signal strength is lower than a preset first threshold of the first control channel and higher than a preset second threshold of the second control channel.

Still further, the transmitter 71 is specifically configured to: send, by the user equipment, the indication information to the network side device if a current moment is within a preset report timeslot; or skip sending the indication information to the network side device until a report timeslot arrives, if a current moment is not within the report timeslot.

By using a technical solution provided in this embodiment, because user equipment 7 may change a control channel according to an actual situation and send, to a network side device, indication information of a control channel to which the user equipment changes, so that the network side device can send control information to the user equipment 7 according to the foregoing indication information, thereby improving control information sending efficiency.

Figure 17:
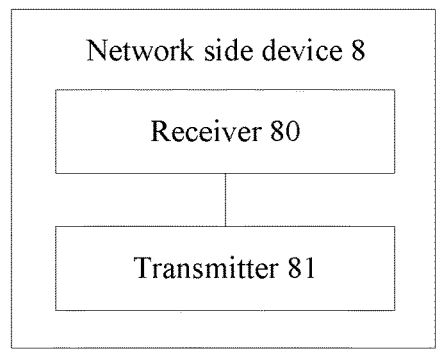
FIG. 17 is a schematic structural diagram of still yet another network side device according to an embodiment of the present invention.

FIG. 17 is a schematic structural diagram of still yet another network side device according to an embodiment of the present invention. As shown in FIG. 17, the network side device 8 includes a receiver 80 and a transmitter 81. The network side device 8 is applied to a scenario in which at least two control channels exist.

Specifically, the receiver 80 is configured to receive indication information that is sent by user equipment and is of a second control channel, where the second control channel is an accessed control channel changed from a first control channel accessed by the user equipment; the transmitter 81 is configured to send control information to the user equipment over the second control channel according to the indication information that is received by the receiver 80 and is of the second control channel.

Further, the receiver 80 is specifically configured to receive, within a preset report timeslot, the indication information that is sent by the user equipment and is of the second control channel.

In this embodiment, a network side device 8 receives indication information that is sent by user equipment and is of a second control channel to which the user equipment changes; and sends control information to the user equipment over this control channel, thereby improving control information sending efficiency.

Figure 18:
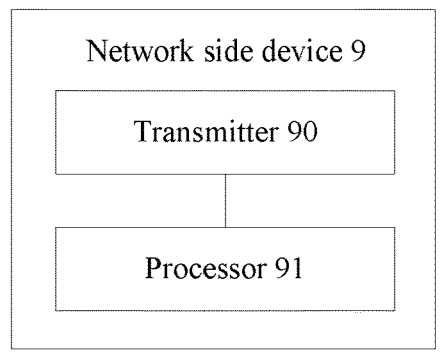
FIG. 18 is a schematic structural diagram of a further network side device according to an embodiment of the present invention.

FIG. 18 is a schematic structural diagram of a further network side device according to an embodiment of the present invention. As shown in FIG. 18, the network side device 9 includes a transmitter 90 and a processor 91. The network side device 8 is applied to a scenario in which at least two control channels exist.

Specifically, the transmitter 90 is configured to send a first access message to user equipment over a first control channel accessed by the user equipment.

Further, the transmitter 90 is further configured to repeatedly send a second access message to the user equipment over a second control channel after the first access message is sent and before feedback information sent by the user equipment is received, where the second control channel includes at least one control channel except the first control channel. The processor 91 is configured to determine that the transmitter 90 repeatedly sends the second access message until a preset sending stop condition is met; or the processor 91 is configured to receive, after the transmitter 90 sends the second access message, a first feedback message sent by the user equipment. The transmitter 90 is configured to send control information to the user equipment over the second control channel after the processor 91 determines that the preset sending stop condition is met or the processor 91 receives the first feedback message.

Further, the transmitter 90 is specifically configured to send the second access message to the user equipment according to a level of the second control channel.

Still further, the transmitter 90 is specifically configured to sequentially send, starting from a second control channel of a lowest coverage level, the second access message to the user equipment over all second control channels in ascending order of coverage levels, until the preset sending stop condition is met or the first feedback message sent by the user equipment is received.

In this embodiment, a network side device 9 first sends a first access message to user equipment over a first control channel accessed by the user equipment. If feedback information sent by the user equipment is not received, the network side device 9 sends a second access message to the user equipment over a second control channel until a preset sending stop condition is met or a first feedback message sent by the user equipment is received. Then, the network side device may send control information to the user equipment over a second control channel on which the first feedback message sent by the user equipment is received. Therefore, when a control channel on which the user equipment is located changes, the user equipment does not need to send information to the network side device 9; instead, the network side device 9 actively traverses to the control channel on which the user equipment is located, thereby not only improving control information sending efficiency, but also reducing a battery loss of the user equipment.

Figure 19:
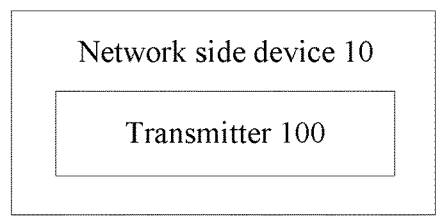
FIG. 19 is a schematic structural diagram of a still further network side device according to an embodiment of the present invention.

FIG. 19 is a schematic structural diagram of still further network side device according to an embodiment of the present invention. As shown in FIG. 19, the network side device 10 includes a transmitter 100. The network side device 10 is applied to a scenario in which one control channels exists.

Specifically, the transmitter 100 is configured to send a third access message to user equipment over the control channel within each sending timeslot, until a preset sending stop condition is met or a second feedback message sent by the user equipment is received.

Further, the transmitter 100 is further configured to send data to the user equipment over a data channel according to a quantity of times of repeatedly sending the third access message.

In this embodiment, a network side device 100 sends a third access message to user equipment over a control channel within each sending timeslot, until a preset sending stop condition is met or a second feedback message sent by the user equipment is received; and then sends data to the user equipment over a data channel according to a quantity of times of repeatedly sending the third access message, thereby improving data channel sending efficiency.

Figure 20:
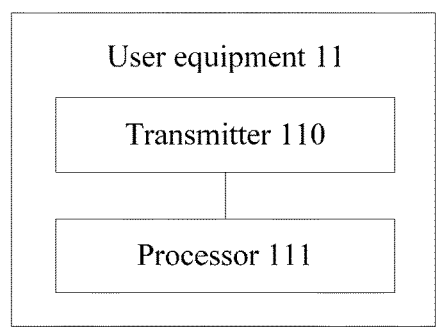
FIG. 20 is a schematic structural diagram of yet another user equipment according to an embodiment of the present invention.

FIG. 20 is a schematic structural diagram of yet another user equipment according to an embodiment of the present invention. As shown in FIG. 20, the user equipment 11 includes a transmitter 110 and a processor 111. The user equipment 11 is applied to a scenario in which one control channel exists.

Specifically, the transmitter 110 is configured to separately receive, over the control channel within at least two sending timeslots, a third access message sent by a network side device; and there is an error in decoding the third access message; the processor 111 is configured to perform combination decoding on the third access messages received within the at least two sending timeslots.

In this embodiment, user equipment 11 performs combination decoding on third access messages received within at least two sending timeslots, which can improve third access message decoding efficiency, thereby improving efficiency of accessing a network side device by the user equipment 11.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method of sending control information, comprising:
   determining, by a user equipment, to change a control channel from a first control channel accessed by the user equipment and having a first coverage level to a second control channel having a second coverage level different than the first coverage level based upon signal strength measured by the user equipment, a first preset threshold of the first control channel, and a second preset threshold of the second control channel; and
   sending, by the user equipment, indication information of the second control channel to a network side device; and
   receiving, by the user equipment from the network side device, control information over the second control channel according to the indication information of the second control channel.

2. The method according to claim 1, wherein the determining, by the user equipment, to change the control channel from the first control channel to the second control channel comprises:
   measuring, by the user equipment, the signal strength, wherein the signal strength is reference signal strength of a cell in which the user equipment is currently located, or the signal strength is signal strength of the first control channel; and
   determining, by the user equipment, to change the control channel from the first control channel to the second control channel when the measured signal strength is lower than the preset first threshold of the first control channel and higher than the preset second threshold of the second control channel.

3. The method according to claim 1, wherein the sending, by the user equipment, the indication information of the second control channel to the network side device comprises:
   sending, by the user equipment, the indication information to the network side device when a current moment is within a preset report timeslot; or skipping sending the indication information to the network side device until a report timeslot arrives, when a current moment is not within the report timeslot.

4. The method according to claim 1, wherein the indication information comprises at least one of the following: time domain information, frequency domain information, scrambling code information, or a preset change identifier of the second control channel.

5. A user equipment, comprising:
   a processor, configured to
       determine to change a control channel from a first control channel accessed by the user equipment and having a first coverage level to a second control channel having a second coverage level different than the first coverage level based upon signal strength measured by the user equipment, a preset first threshold of the first control channel, and a preset second threshold of the second control channel;

a transmitter, configured to send indication information of the second control channel determined by the processor to a network side device; and a receiver, configured to receive from the network side device control information over the second control channel according to the indication information of the second control channel.

6. The user equipment according to claim 5, wherein the processor is configured to:

measure the signal strength, wherein the signal strength is reference signal strength of a cell in which the user equipment is currently located, or the signal strength is signal strength of the first control channel; and determine to change the control channel from the first control channel to the second control channel, when the measured signal strength is lower than the preset first threshold of the first control channel and higher than the preset second threshold of the second control channel.

7. The user equipment according to claim 5, wherein the transmitter is configured to:

send the indication information to the network side device when a current moment is within a preset report timeslot; or skip sending the indication information to the network side device until a report timeslot arrives, when a current moment is not within the report timeslot.

8. A network side device, comprising:

a receiver, configured to receive from a user equipment indication information of a second control channel changed from a first control channel accessed by the user equipment, the first control channel having a first coverage level and the second control channel having a second coverage level different than the first coverage level; and a transmitter, configured to send to the user equipment control information over the second control channel according to the indication information that is received by the receiver and is of the second control channel.

9. The network side device according to claim 8, wherein the receiver is configured to:

receive, within a preset report timeslot, the indication information from the user equipment and is of the second control channel.

10. A method of a network side device, the method comprising:

receiving, by a receiver from a user equipment, indication information of a second control channel changed from a first control channel accessed by the user equipment, the first control channel having a first coverage level and the second control channel having a second coverage level different than the first coverage level; and sending, by a transmitter to the user equipment, control information over the second control channel according to the indication information that is received by the receiver and is of the second control channel.

11. The method of the network side device according to claim 10, further comprising:

receiving, by the receiver, within a preset report timeslot, the indication information from the user equipment and is of the second control channel.

* * * * *